R. E. HELLMUND.
ARMATURE EXCITED DYNAMO ELECTRIC MACHINE.
APPLICATION FILED DEC. 1, 1916.

1,395,344.

Patented Nov. 1, 1921.
2 SHEETS—SHEET 2.

WITNESSES:
Ed Plinke.
S. C. Davis

INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

ARMATURE-EXCITED DYNAMO-ELECTRIC MACHINE.

1,395,344.     Specification of Letters Patent.     Patented Nov. 1, 1921.

Application filed December 1, 1916. Serial No. 134,264.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Armature-Excited Dynamo-Electric Machines, of which the following is a specification.

My invention relates to alternating-current motors of the commutator type, and it has for its object to provide a machine of the character designated that may be started and brought up to speed with good torque and commutating characteristics and which may thereafter be operated efficiently and substantially sparklessly.

More specifically, my invention relates to a motor of the double-fed type to be energized from a transformer, said motor being provided with means for producing a rotor magnetizing field therein, said magnetizing field being energized by the primary current of said transformer.

Figure 1:
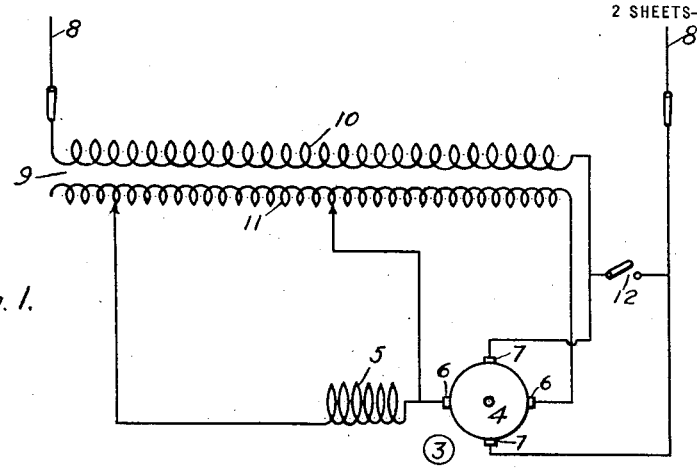

In the accompanying drawing, Figure 1 is a diagrammatic view of an alternating-current, commutator motor, together with supply and control circuits embodying one form of my invention, and Figs. 2, 3, 4 and 5 are diagrammatic views of modifications of the system shown in Fig. 1.

It is well known that, in starting an alternating-current commutator motor, it is desirable to weaken the magnetizing field in order to reduce the transformer electromotive force in the armature coils undergoing commutation.

It is usual to operate motors of the character designated, particularly if of the doubly-fed type, in conjunction with a transformer, the armature, exciting field and inducing field windings being connected to various points in the secondary winding of said transformer and the voltage adjustments being obtained by shifting the points of connection to said secondary winding. It is obvious that, in a system of this character, with the points of attachment to the seconary winding relatively close together for the production of relatively small voltages in the motor circuits, the ratio of transformation of the transformer is such as to provide relatively small currents in the primary winding thereof. As the voltages on the different portions of the motor circuit are raised, there is an increase in the primary transformer current.

It has been proposed to connect the stator magnetizing field winding of an alternating-current commutator motor in series relation with the supply transformer so that the above-described weakening of the magnetizing field at starting may be automatically obtained because of the small transformer primary current at starting.

By the present invention, I obtain a similar effect to the above, but I provide a portion or all of the magnetizing field magnetomotive force in the rotor winding by connecting a suitable pair of exciting brushes in series relation with the transformer primary circuit. In this way, an excellent load characteristic is obtained for starting purposes. Having brought the motor up to speed, it is frequently desirable to impart a shunt or limited-speed characteristic thereto and this result may be simply and effectively obtained by merely interconnecting said exciting brushes, either directly or through a portion of the transformer secondary winding. Thus, I am enable to provide a motor which has no stator exciting winding but which, nevertheless, has exceptionally good starting and running characteristics.

My system is of particular applicability in connection with doubly-fed motors for following reason. If the armature winding be employed as the sole source of the magnetizing field, all the load current flowing there-through, a field of excessive strength ordinarily results. If it be attempted to minimize this effect in the double-fed motor by ordinary means, short-circuiting is produced .

Energization of the magnetizing brushes, by the primary load current, provides the desired relatively weak magnetizing field and, at the same time, no disastrous short-circuits are established.

Referring to the drawing for a more detailed understanding of my invention, I show an alternating-current commutator motor at 3 in Fig. 1, said motor comprising an armature 4 and an inducing winding 5. The armature 4 is provided with a commutator cylinder upon which bear main brushes 6—6, electrically in line with the inducing field winding 5 and auxiliary exciting brushes 7—7, preferably in electrical quadrature with the brushes 6—6.

Energy for the operation of the motor 3 is obtained from suitable mains 8—8 through a transformer 9 comprising a primary winding 10 and a secondary winding 11. The inducing field winding 5 and the main brushes 6—6 are connected across portions of the secondary winding 11, as is usual in doubly-fed motors. The exciting brushes 7—7 are connected in series relation between the right-hand terminal of the primary winding 10 and the right-hand main 8. The right-hand main 8 may be connected directly to the right-hand terminal and the brushes 7—7 directly together by the closure of a suitable switch 12.

Having thus described the arrangement of a system embodying my invention, the operation is as follows. Upon supplying energy to the mains 8—8, the secondary winding 11 supplies load current and a commutating field to the armature 4. The various tap members are moved relatively close together so that the voltages imposed upon the motor from the secondary winding are relatively low. A flow of weak primary current through the primary winding 10 is thus produced and, consequently, a weak magnetizing field is produced in the armature 4 in line with the brushes 7—7. The motor 3 now starts and is accelerated by so moving the connections to the transformer winding as to increase the voltage applied to the various motor windings. As a result, there is a gradual increase in the transformer primary current and a consequent increase in the magnetizing field, thus producing a series of load-operating characteristic, as is desirable in connection with many types of load, such, for example, as electric railway and hoisting loads.

Having brought the motor 3 up to the desired speed, it is frequently desirable to operate with a shunt or limited-speed characteristic because of the substantially constant speed and good commutation obtained under these conditions. I, may, therefore, close the switch 12, whereupon the transformer primary winding 10 is connected directly to the mains, and the sole electromotive force for the production of current flow through the brushes 7—7 is obtained by the cutting of the inducing field by the armature conductors.

Figure 2:
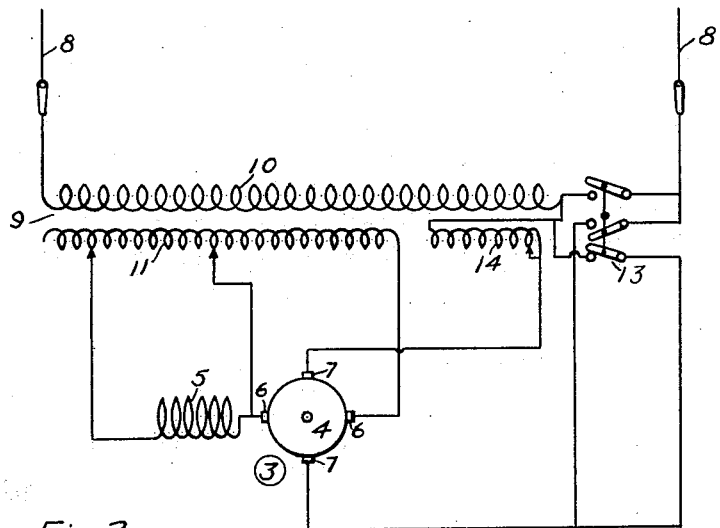

It frequently happens that the magnetizing electromotive force, thus produced by the cutting of the inducing field, is insufficient in amount or of such phase as to fail to give the desired torque. I may, therefore, combine therewith an electromotive force obtained directly from the transformer. A system of this character is shown in Fig. 2 wherein many of the elements are as shown in Fig. 1 and are similarly designated. The transformer 9, however, is provided with an auxiliary secondary winding 14, permanently connected in series with the brushes 7—7. A multi-contact switch 13 or any equivalent switching means is provided whereby the brushes 7—7, together with the secondary winding 14, may be connected in series with the transformer primary winding or whereby the brushes 7—7 may be interconnected through the secondary winding 14.

In the operation of the system of Fig. 2, the switch 13 is first thrown into the upper position, whereby the brushes 7—7 and the secondary winding 14 are connected in the transformer primary circuit. The motor is then gradually brought up to speed, and the magnetizing field thereof is produced by the joint action of the primary load current and of the electromotive force established in the winding 14. Having brought the motor up to speed, the switch 13 is thrown to the down position, whereupon the brushes 7—7 are interconnected through the secondary winding 14, and the right hand main 8 is connected directly to the transformer primary winding 10. The magnetizing field of the motor is produced by currents circulating through the brushes 7—7, said current being provided by the electromotive force resulting from compounding the rotational electromotive force produced by cutting the inducing field and the electromotive force of the secondary winding 14. By adjusting said transformer electromotive force, a wide adjustment of the magnetizing field of the motor, both in magnitude and phase, may be obtained.

It is frequently desirable to obtain a still more flexible control of the shape of the speed characteristic and it is, furthermore, desirable, in certain cases, to improve the power factor of the motor. Both of these ends may be achieved by associating resistors and reactors with the interconnection between the magnetizing field brushes, as is shown, for example, in Fig. 3. The motor 3 is of the form shown in Fig. 1 and corresponding parts are similarly designated. In starting, current is permitted to flow from the right-hand main 8 through the brushes 7—7 and to the primary winding 10, as previously described. When, however, the switch 12 is closed, the right-hand main 8 is connected to the primary winding 10 through a resistor 15, a reactor 16 and the auxiliary secondary winding 14. In like manner, the interconnection of the brushes 7—7 takes place through the same elements. Thus, the resistor 15 and the reactor 16 are traversed by the difference between the main transformer primary current and the magnetizing field current of the motor 3. The effect of the resistor 15 is to improve the power factor of the motor, and the effect of the reactor 16 is to flatten the limited-speed characteristics obtaining with the factor in question.

Figure 3:
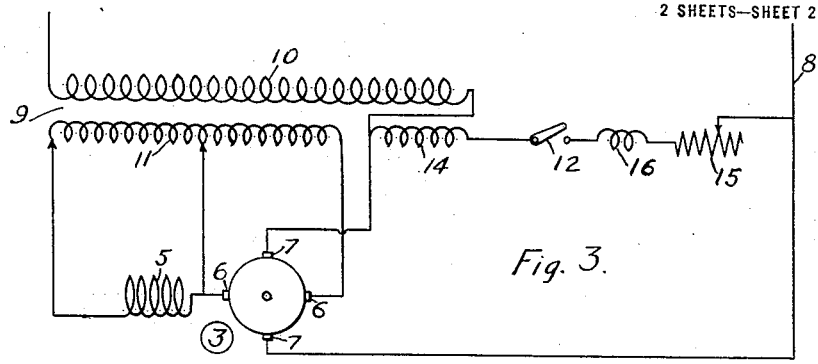
Figure 4:
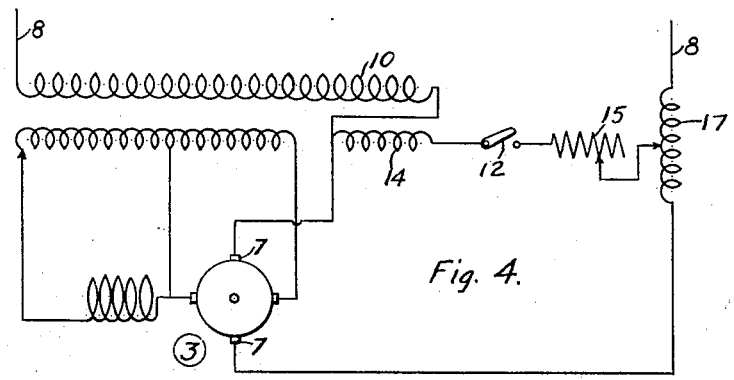

It may be desired to steepen the limited-speed characteristic of the motor and, for this purpose, I may employ the connections shown in Fig. 4, which are the same as shown in Fig. 3 except that the reactor 16 is replaced by a reactor 17, a portion of which is inserted directly in the main 8 and the remainder of which is connected in series relation with the lower brush 7. The point of attachment of the resistor 15 thereto may be adjusted, as shown. In operation, the reactor 17 is, in effect, traversed by the sum of the transformer primary currents and of the magnetizing field current of the motor and, in consequence, the limited-speed characteristic of the motor is rendered steeper.

Figure 5:
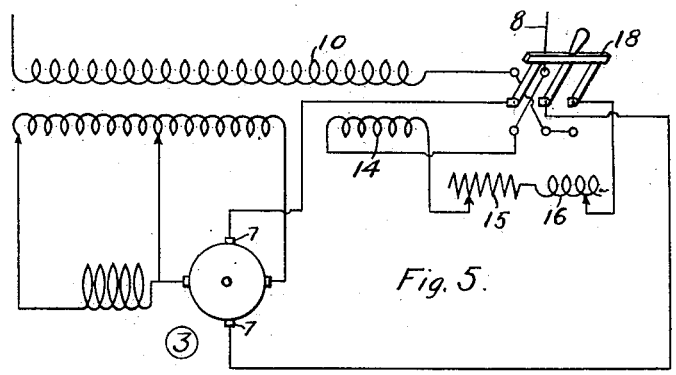

If it be desired to have an additive or cumulative effective in both the resistor and the reactor, the connections shown in Fig. 5 may be employed. The elements are as previously described with the exception that a multi-blade, double-throw switch 18, or equivalent means, is provided for effecting a variety of circuit changes. For starting, the switch 18 is thrown upwardly, whereupon, a connection is established for the right-hand main 8 through the brushes 7—7 of the motor 3 and thence to the primary winding 10. For subsequent operation, with a limited-speed characteristic, the switch 18 is thrown to the downward position, whereupon, a connection is established from the right-hand main 8 through the auxiliary secondary winding 14 in a reverse direction, thence through the resistor 15 and the reactor 16 and finally to the main primary winding 10. Simultaneously, a connection is established through the brushes 7—7 in parallel with said secondary winding 14 and the elements 15 and 16. The relative polarities are such, however, that both the resistor 15 and the reactor 16 are traversed by the sum of the primary current of the main transformer and the magnetizing current of the motor 3. Thus, a more pronounced power-factor correction is obtained than in the system of the preceding figures and, at the same time, the steepening of the speed characteristic attendant upon the passage of the additive combined currents through the reactor 16 is obtained.

While I have shown my invention in a plurality of forms, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with a source of alternating current, of a transformer comprising primary and secondary windings, connections from said source to the primary winding of said transformer, an alternating-current motor comprising a stator inducing field winding and an armature provided with a commutator cylinder provided with a plurality of brushes positioned to establish electrically displaced fields for said motor, one set of said brushes being electrically substantially in line with said inducing field winding, connections from the brushes of said set and from the terminals of said inducing field winding to points in the secondary field winding of said transformer, means for connecting another set of said brushes in series relation with the primary winding of said transformer, whereby a rotor magnetizing field is produced in said motor which varies with the primary load current of said transformer, alternative means for establishing a closed circuit between the members of the last-named brush set such that a portion thereof is traversed by the resultant of the closed-circuit current and of the current furnished from the source, and an external resistor connected in said circuit portion.

2. The combination with a supply transformer, of a commutator motor connected to the secondary winding thereof, a pair of brushes in position to establish a magnetizing field for said motor, means for connecting said brushes in series relation with the primary winding of said transformer, and means for transferring the brushes to a mutual interconnection embodying a resistor and a reactor that are traversed by the sum of the primary transformer current and the motor magnetizing current.

3. The combination with a supply transformer, of a commutator motor connected to the secondary winding thereof, a pair of brushes in position to establish a magnetizing field for said motor, means for connecting said brushes in series relation with the primary winding of said transformer, a circuit embodying a resistor and a reactor, and means for connecting said circuit in series relation with said primary winding and in shunt relation to said brushes to impart a limited-speed characteristic to the motor, said resistor and reactor being traversed by the sum of the primary transformer current and the motor magnetizing current.

In testimony whereof, I have hereunto subscribed my name this 24th day of Nov., 1916.

RUDOLF E. HELLMUND.